(12) United States Patent
Wang et al.

(10) Patent No.: US 11,995,881 B2
(45) Date of Patent: May 28, 2024

(54) METHOD, ELECTRONIC DEVICE, AND COMPUTER PROGRAM PRODUCT FOR TRAINING DATA CLASSIFICATION MODEL

(71) Applicant: Dell Products L.P., Round Rock, TX (US)

(72) Inventors: Zijia Wang, WeiFang (CN); Wenbin Yang, Shanghai (CN); Jiacheng Ni, Shanghai (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 339 days.

(21) Appl. No.: 17/580,946

(22) Filed: Jan. 21, 2022

(65) Prior Publication Data

US 2023/0215142 A1 Jul. 6, 2023

(30) Foreign Application Priority Data

Dec. 31, 2021 (CN) .......................... 202111660132.3

(51) Int. Cl.
*G06V 10/00* (2022.01)
*G06V 10/764* (2022.01)
*G06V 10/774* (2022.01)

(52) U.S. Cl.
CPC .......... *G06V 10/765* (2022.01); *G06V 10/774* (2022.01)

(58) Field of Classification Search
CPC .... G06V 10/765; G06V 10/774; G06V 10/82; G06V 10/776; G06N 3/04; G06N 3/084; G06N 3/045; G06N 3/092; G06N 3/0475; G06N 3/042; G06N 3/049; G06N 3/0464;
(Continued)

(56) References Cited

U.S. PATENT DOCUMENTS 8,000,530 B2 * 8/2011 Jiang ..................... G06F 16/353
382/181
8,407,164 B2 * 3/2013 Malik ................... G06F 18/231
706/12
(Continued)

OTHER PUBLICATIONS

Yang, "CN113762308A Training method, classification method, device, medium and equipment of classification model", Publication Date: Dec. 7, 2021.*
(Continued)

*Primary Examiner* — Amir Alavi
(74) *Attorney, Agent, or Firm* — Ryan, Mason & Lewis, LLP

(57) ABSTRACT

Embodiments of the present disclosure relate to a method, an electronic device, and a computer program product for training a data classification model. The method includes generating a first training rule based on probabilities of classifying a plurality of sample data into corresponding classes by a data classification model. The method also includes generating a second training rule based on relevances of the plurality of sample data to the corresponding classes. In addition, the method also includes training the data classification model using the first training rule and the second training rule. With this method, a data classification model is trained, so that the data classification accuracy of the data classification model and the robustness to noise can be improved.

21 Claims, 5 Drawing Sheets

(58) Field of Classification Search
CPC ........ G06N 3/082; G06N 3/0454; G06N 3/02; G06F 16/212; G06F 16/906; G06F 16/951
See application file for complete search history.

(56) References Cited

U.S. PATENT DOCUMENTS

| | | | | |
|---|---|---|---|---|
| 8,799,193 | B2* | 8/2014 | Bollinger | G06N 5/025 706/45 |
| 8,868,468 | B2* | 10/2014 | Peng | G06F 40/30 706/45 |
| 9,830,502 | B2* | 11/2017 | Cohen | G06F 18/24 |
| 10,446,272 | B2* | 10/2019 | Wilde | C12Q 1/6886 |
| 10,679,738 | B2* | 6/2020 | Ganesan | G16H 15/00 |
| 10,853,858 | B2* | 12/2020 | Yang | G06Q 30/0603 |
| 11,082,438 | B2* | 8/2021 | Peinador | G06N 3/04 |
| 11,741,215 | B1* | 8/2023 | Dods | G06F 21/604 726/6 |
| 11,741,956 | B2* | 8/2023 | Chaudhary | G06F 40/30 704/232 |
| 2023/0215142 | A1* | 7/2023 | Wang | G06V 10/776 382/159 |

OTHER PUBLICATIONS

NPL (Year: 2021).*
Y. Wang et al., "Symmetric Cross Entropy for Robust Learning with Noisy Labels," arXiv:1908.06112v1, Aug. 16, 2019, 11 pages.
Y. Wang et al., "Iterative Learning with Open-set Noisy Labels," arXiv:1804.00092v1, Mar. 31, 2018, 9 pages.
E. Arazo et al., "Unsupervised Label Noise Modeling and Loss Correction," arXiv:1904.11238v2, Jun. 5, 2019, 12 pages.
Z. Zhang et al., "Generalized Cross Entropy Loss for Training Deep Neural Networks with Noisy Labels," arXiv:1805.07836v4, Nov. 29, 2018, 14 pages.
A. Ghosh et al., "Robust Loss Functions under Label Noise for Deep Neural Networks," arXiv:1712.09482v1, Dec. 27, 2017, 14 pages.
L. Jiang et al., "MentorNet: Learning Data-Driven Curriculum for Very Deep Neural Networks on Corrupted Labels," arXiv:1712.05055v2, Aug. 13, 2018, 20 pages.
E. Malach et al., "Decoupling "when to update" from "how to update"," arXiv:1706.02613v2, Mar. 26, 2018, 19 pages.
T. Xiao et al., "Learning from Massive Noisy Labeled Data for Image Classification," 2015 IEEE Conference on Computer Vision and Pattern Recognition, Jun. 7-12, 2015, pp. 2691-2699.
A. Vahdat et al., "Toward Robustness against Label Noise in Training Deep Discriminative Neural Networks," arXiv:1706.00038v2, Nov. 3, 2017, 12 pages.
Y. Li et al., "Learning from Noisy Labels with Distillation," arXiv:1703.02391v2, Apr. 7, 2017, 9 pages.
A. K. Menon et al., "Can Gradient Clipping Mitigate Label Noise?" International Conference on Learning Representations, Sep. 25, 2019, 26 pages.
C. Szegedy et al., "Rethinking the Inception Architecture for Computer Vision," arXiv:1512.00567v3, Dec. 11, 2015, 10 pages.
H. Zhang et al., "mixup: Beyond Empirical Risk Minimization," arXiv:1710.09412v2, Apr. 27, 2018, 13 pages.
V. N. Vapnik, "An Overview of Statistical Learning Theory," IEEE Transactions on Neural Networks, vol. 10, No. 5, Sep. 1999, pp. 988-999.
Y. Guo et al., "Recent Advances in Large Margin Learning," arXiv:2103.13598v2, Jun. 21, 2021, 8 pages.
H. Wang et al., "CosFace: Large Margin Cosine Loss for Deep Face Recognition," arXiv:1801.09414v2, Apr. 3, 2018, 11 pages.
J. Deng et al., "ArcFace: Additive Angular Margin Loss for Deep Face Recognition," arXiv:1801.07698v3, Feb. 9, 2019, 11 pages.
S. Fort, "Gaussian Prototypical Networks for Few-Shot Learning on Omniglot," arXiv:1708.02735v1, Aug. 9, 2017, 14 pages.
Y. Yu et al., "Learning Diverse and Discriminative Representations via the Principle of Maximal Coding Rate Reduction," arXiv:2006.08558v1, Jun. 15, 2020, 28 pages.
S. G. Kobourov, "Spring Embedders and Force Directed Graph Drawing Algorithms," Computer Science, 2012, 23 pages.
J. Li et al., "DivideMix: Learning with Noisy Labels as Semi-supervised Learning," arXiv:2002.07394v1, Feb. 18, 2020, 14 pages.
Q. Yao et al., "Searching to Exploit Memorization Effect in Learning with Noisy Labels," Proceedings of the 37th International Conference on Machine Learning, Jul. 13-18, 2020, 10 pages.
M. Li et al., "Gradient Descent with Early Stopping is Provably Robust to Label Noise for Overparameterized Neural Networks," arXiv:1903.11680v3, Jul. 3, 2019, 37 pages.
L. Van Der Maaten et al., "Visualizing Data using t-SNE," Journal of Machine Learning Research, vol. 9, Nov. 2008, pp. 2579-2605.
G. Patrini et al., "Making Deep Neural Networks Robust to Label Noise: a Loss Correction Approach," arXiv:1609.03683v2, Mar. 22, 2017, 9 pages.
S. E. Reed et al., "Training Deep Neural Networks on Noisy Labels with Bootstrapping," arXiv:1412.6596v3, Apr. 15, 2015, 11 pages.
A. Krizhevsky, "Learning Multiple Layers of Features from Tiny Images," Computer Science, Apr. 8, 2009, 60 pages.
Github, "ImageNette: A smaller subset of 10 easily classified classes from imagenet," https://github.com/fastai/imagenette, Accessed Oct. 8, 2021, 9 pages.
K. He et al., "Deep Residual Learning for Image Recognition," arXiv:1512.03385v1, Dec. 10, 2015, 12 pages.

* cited by examiner

METHOD, ELECTRONIC DEVICE, AND COMPUTER PROGRAM PRODUCT FOR TRAINING DATA CLASSIFICATION MODEL

RELATED APPLICATION(S)

The present application claims priority to Chinese Patent Application No. 202111660132.3, filed Dec. 31, 2021, and entitled "Method, Electronic Device, and Computer Program Product for Training Data Classification Model," which is incorporated by reference herein in its entirety.

FIELD

Embodiments of the present disclosure relate to the field of computers and, more particularly, to the technical field of artificial intelligence. Embodiments of the present disclosure provide a method, an electronic device, an apparatus, a medium, and a computer program product for training a data classification model.

BACKGROUND

With the development of artificial intelligence technology, various data classification models for classifying data have emerged, for example, neural network models for classifying images. In order to improve the accuracy of data classification models, a large number of training samples are required. However, it is difficult to acquire appropriate training samples, and even some training samples have labels that are erroneous (referred to herein as noise), which in turn makes data classification models unable to classify data into correct classes. Therefore, a method for training a data classification model that improves the classification accuracy of the data classification model and improves the anti-noise capacity is demanded.

SUMMARY

Embodiments of the present disclosure provide a method, an electronic device, an apparatus, a medium, and a computer program product for training a data classification model.

In a first aspect of the present disclosure, a method for training a data classification model is provided. The method includes generating a first training rule based on probabilities of classifying a plurality of sample data into corresponding classes by a data classification model. The method also includes generating a second training rule based on relevances of the plurality of sample data to the corresponding classes. In addition, the method also includes training the data classification model using the first training rule and the second training rule.

In a second aspect of the present disclosure, an electronic device is provided. The electronic device includes a processor and a memory coupled to the processor, and the memory has instructions stored therein which, when executed by the processor, cause the device to perform actions. The actions include generating a first training rule based on probabilities of classifying a plurality of sample data into corresponding classes by a data classification model. The actions also include generating a second training rule based on relevances of the plurality of sample data to the corresponding classes. In addition, the actions also include training the data classification model using the first training rule and the second training rule.

In a third aspect of the present disclosure, an apparatus for training a model is provided. The apparatus includes: a first training rule generating module, configured to generate a first training rule based on probabilities of classifying a plurality of sample data into corresponding classes by a data classification model. The apparatus also includes a second training rule generating module, configured to generate a second training rule based on relevances of the plurality of sample data to the corresponding classes. In addition, the apparatus also includes a training module, configured to train the data classification model using the first training rule and the second training rule.

In a fourth aspect of the present disclosure, a computer-readable storage medium is provided. The computer-readable storage medium has one or more computer instructions stored thereon, which are executed by a processor to implement the method according to the first aspect.

In a fifth aspect of the present disclosure, a computer program product is provided. The computer program product includes one or more computer instructions which are executed by a processor to implement the method according to the first aspect.

This Summary is provided to introduce the selection of concepts in a simplified form, which will be further described in the Detailed Description below. The Summary is not intended to identify key features or essential features of the claimed subject matter, nor is it intended to be used to limit the scope of the claimed subject matter.

BRIEF DESCRIPTION OF THE DRAWINGS

The above and other features, advantages, and aspects of embodiments of the present disclosure will become more apparent with reference to the accompanying drawings and the following detailed description. In the accompanying drawings, identical or similar reference numerals represent identical or similar elements, in which.

In all the accompanying drawings, identical or similar reference numerals indicate identical or similar elements.

DETAILED DESCRIPTION

Figure 1:
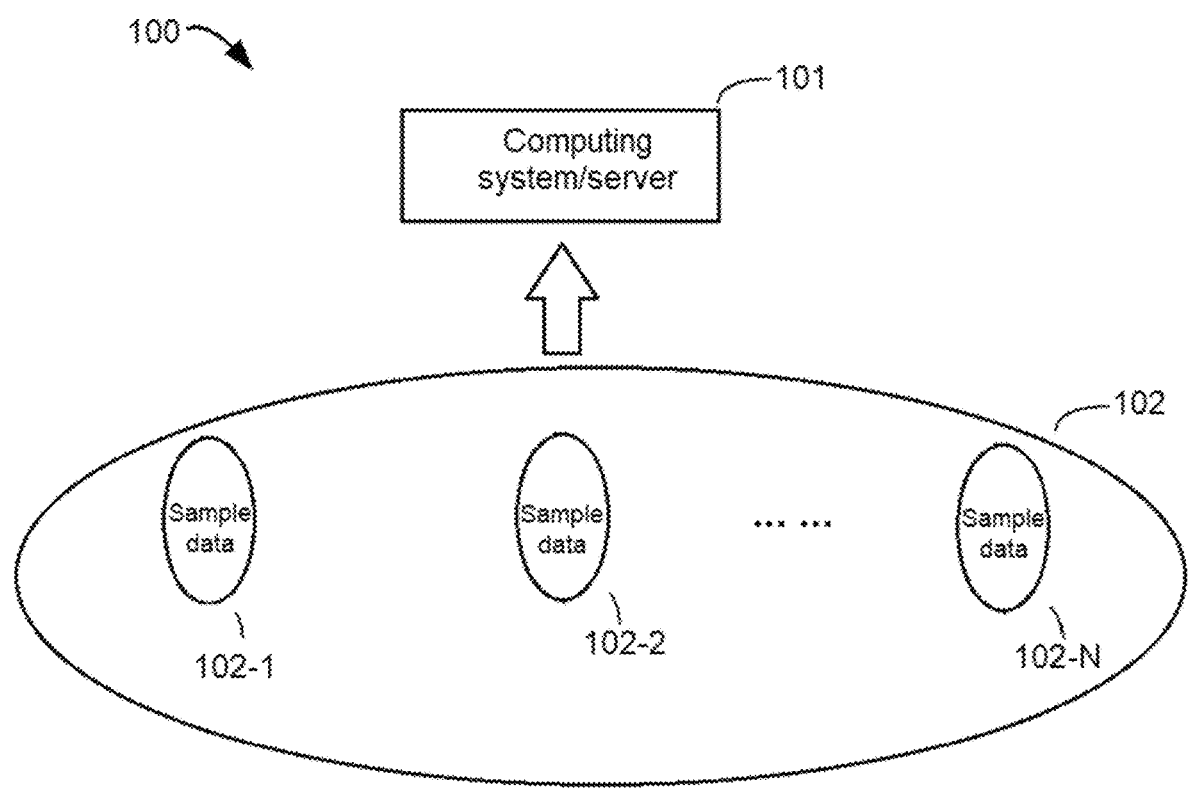
FIG. 1 illustrates a schematic diagram of an example environment in which embodiments of the present disclosure can be implemented.

The following will describe embodiments of the present disclosure in more detail with reference to the accompanying drawings. Although the drawings show certain embodiments of the present disclosure, it should be understood that the present disclosure can be implemented in various forms and should not be limited by the embodiments described herein. Instead, these embodiments are provided to enable a more thorough and complete understanding of the present disclosure. It should be understood that the accompanying drawings and embodiments of the present disclosure are for exemplary purposes only, and are not intended to limit the protection scope of the present disclosure.

The term "include" and its variants as used herein mean open-ended inclusion, i.e., "including but not limited to." The term "based on" is "based at least in part on." The term "one embodiment" means "at least one embodiment." The term "another embodiment" means "at least one further embodiment." The terms "first," "second," and the like may refer to different or the same objects. Other explicit and implicit definitions may also be included below.

The inventors have observed that data classification models based on neural networks (e.g., deep neural networks (DNN)) are well capable of classifying data and have been commonly used. However, training a data classification model requires a large amount of labeled (e.g., tagged) sample data. The tagging of these sample data may be manual or crawled from the network, so there are large amounts of noise. This noise will seriously affect the classification performance of the data classification model. Meanwhile, large amounts of noise may make the data classification model learn the features of the large amounts of noise, so that the phenomenon of over-fitting occurs, and the performance of the data classification model is reduced. Therefore, there is an urgent need for a method for training a data classification model to improve the performance of the data classification model and the robustness to noise.

In view of this, a method of the present disclosure provides a training method for improving the performance of a data classification model. As will be appreciated from the following description, in contrast to known conventional schemes, a first training rule is generated by utilizing probabilities of classifying a plurality of sample data into corresponding classes by a data classification model to train the data classification model, and a second training rule is also generated to train the data classification model based on relevances of the plurality of sample data to the corresponding classes. In this way, the data classification accuracy of the data classification model can be improved, and the noise sensitivity of the data classification model can be reduced, thereby improving the anti-noise capacity of the data classification model. Therefore, the working principle and mechanism of the present disclosure are significantly different from any known methods.

In the following description, some embodiments will be discussed with reference to a DNN. It will be appreciated, however, that the purpose is merely for a better understanding of the principles and concepts of embodiments of the disclosure without limiting the scope of the present disclosure in any way.

FIG. 1 is a schematic diagram of example environment 100 in which embodiments of the present disclosure can be implemented.

At electronic device 101 (e.g., computer system, computing module, server, etc.), sample data, e.g., sample data 102-1 and sample data 102-2 of FIG. 1, is acquired (e.g., received). The sample data (e.g., including photographs taken of various animals) includes features of the data, which are extracted by the DNN, and the sample data is classified into corresponding classes (e.g., photographs of dogs or photographs of cats) according to the extracted features. The sample data is not limited to image data, and the sample data may also be in the form of data such as text, voice, or video.

There may be a plurality of sample data, e.g., first sample data 102-1, second sample data 102-2, ..., and $N^{th}$ sample data 102-N (individually or collectively referred to as sample data 102).

It will be appreciated that example environment 100 shown in FIG. 1 is merely illustrative and is not intended to limit the scope of the present disclosure. Various additional devices, apparatuses, and/or modules may also be included in example environment 100. Moreover, modules shown in FIG. 1 are also merely illustrative and are not intended to limit the scope of the present disclosure. In some embodiments, some modules may be integrated into one physical entity or further split into more modules.

Figure 2:
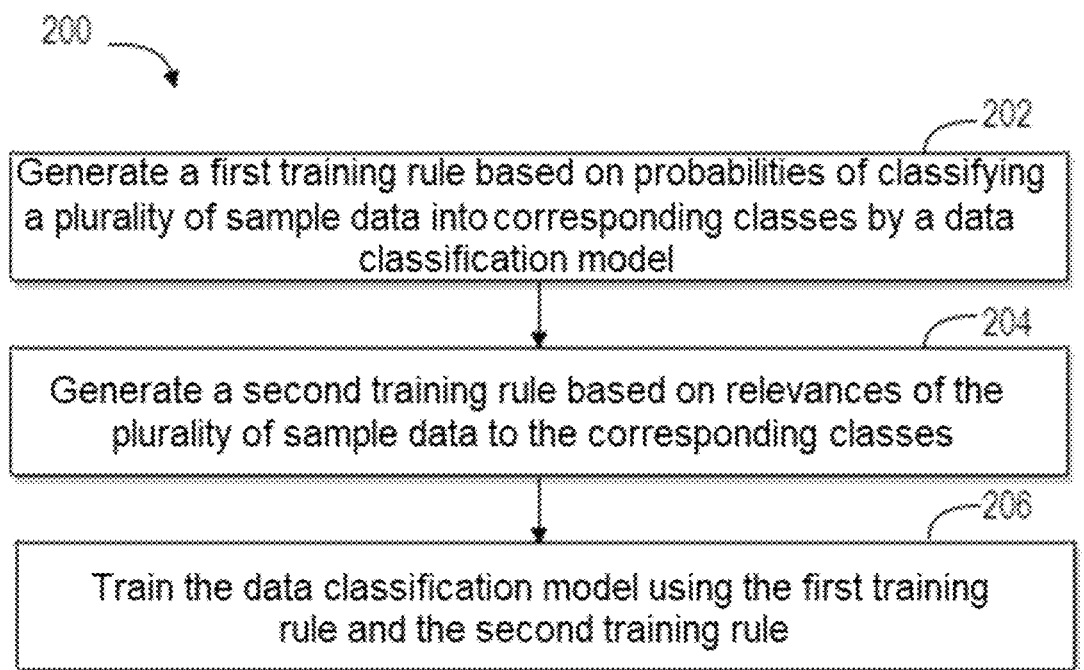
FIG. 2 illustrates a flow chart of a method for training a data classification model according to some embodiments of the present disclosure.

FIG. 2 illustrates a flow chart of a method for training a data classification model according to some embodiments of the present disclosure.

For ease of description, a training process of a data classification model implemented by method 200 will be described with the training of a DNN as an example. As described above, however, this is merely exemplary and is not intended to limit the scope of the present disclosure in any way. Method 200 described herein is equally applicable to the training process of other data classification models.

At block 202, a first training rule is generated based on probabilities of classifying a plurality of sample data 102 into corresponding classes by a data classification model. In the training process, assuming that there are N sample data and K classes, the DNN may generate a probability that $n^{th}$ sample data 102 belongs to class k among K classes for the $n^{th}$ sample data among N sample data 102. A first training rule may also be generated based on the probability. In some embodiments, the first training rule may be a Cross Entropy Loss function (referred to herein as a first loss function for brevity).

In some embodiments, the first loss function may be represented by the following formula:

$$l_{ce}(x_n) = -\sum_{k=1}^{K} q(k \mid x_n) \log(p(k \mid x_n)) \quad (1)$$

where $l_{ce}(x_n)$ represents a cross entropy loss of sample data $x_n$, K represents the number of classes, k represents class k, $q(k|x_n)$ represents a ground truth value of a probability of classifying the sample data $x_n$ as class k, and $p(k|x_n)$ represents the probability of classifying the sample data $x_n$ as class k by a data classification model.

At block 204, a second training rule is generated based on relevances of the plurality of sample data to the corresponding classes. In some embodiments, the relevance may be represented by a normalized posteriori probability indicating that the sample data $x_n$ is classified into class k.

In some embodiments, the relevance may be obtained using the following formulas (2) and (3):

$$d_{n,k} = \exp\left(-\frac{\|z_n - c_k\|_2}{\sigma^2}\right) \quad (2)$$

where $d_{n,k}$ represents a Euclidean distance between the sample data $x_n$ and class k, $c_k$ represents a center feature of class k, and $z_n$ represents a feature of the sample data $x_n$.

$$p(y_{n,k} \mid x_n) = \frac{d_{n,k}}{\sum_{k=1}^{K} d_{n,k}} \quad (3)$$

where $p(y_{n,k}|x_n)$ represents a normalized posteriori probability indicating that the sample data $x_n$ is classified into class k.

In some embodiments, the second training rule may be a symmetric cross entropy loss function (referred to herein as a second loss function for brevity).

In some embodiments, the second loss function may be represented by the following formula:

$$l_{cf}(x_n) = -\sum_{k=1}^{K} p(k|x_n)\log(q(k|x_n)) - \alpha \sum_{k=1}^{K} q(k|x_n)\log(p(k|x_n)) \quad (4)$$

where $l_{cf}(x_n)$ represents a symmetric cross entropy loss for the sample data $x_n$, and $\alpha$ represents a parameter with an adjustable value.

In some embodiments, the second training rule may also include a reconstruction loss function.

In some embodiments, a reconstruction loss function may be represented by the following formula:

$$l_{rec}(x_n) = \max(\|z_n - y_n^T C\|_2, \epsilon) \quad (5)$$

where $l_{rec}(x_n)$ represents a reconstruction loss, E represents a threshold of reconstruction, C represents a set of centers of classes from 1 to k, and A represents the transpose of a tag matrix of the sample data.

At block 206, the data classification model is trained using the first training rule and the second training rule. In some embodiments, the data classification model may be trained using a back propagation algorithm. Back propagation is a technology for optimizing weights in neural networks. Back propagation may be used to check how many losses a node in each neural network is responsible for, and then to update the weights in such a way that losses are minimized by giving lower weights to nodes with higher error rates, and vice versa. Back propagation allows the weights to be adjusted to minimize the difference between an actual output and a desired output.

The combined use of the first training rule and the second training rule causes the output of the data classification model to approach both the tag and its predicted output (i.e., classes obtained by classification) at the time of training. Therefore, the data classification accuracy of the data classification model can be improved. Meanwhile, since the reconstruction loss may also be included in the second loss function, the relevances of the outputs of the data classification model to the corresponding classes are enhanced. Therefore, the data classification model trained in this way can effectively resist noise and is noise-robust.

In some embodiments, method 200 may also include clustering the plurality of sample data to determine corresponding central sample data located at each cluster center among the plurality of sample data. Method 200 may also include generating a third training rule based on corresponding distances between the central sample data and adjacent central sample data. In addition, method 200 may also include training the data classification model using the first training rule, the second training rule, and the third training rule.

The third training rule may include central regularization of the sample data. Specifically, sample data 102 may be processed using the following formulas (6) and (7).

Considering the analogy of sample data 102 to molecules, a corresponding mathematical relationship between sample data 102 may be simulated using a function of a relationship between intermolecular distances and intermolecular attractions and repulsions (e.g., a potential energy relationship).

$$F(r) = \frac{1}{r^u} - \frac{1}{r^v} \quad (6)$$

where r represents a distance between two sample data 102, $v > u > 0$, v represents the power of a repulsion, and u represents the power of an attraction. It is assumed that $r_0$ represents a distance that minimizes potential energy.

$$L_{pem}(C) = \sum_{i=1}^{K-1} \sum_{j=i+1}^{K} \left[ \frac{1}{(\gamma dis(c_i, c_j) + b)^2} - \frac{1}{(\gamma dis(c_i, c_j) + b)^3} \right] \quad (7)$$

where $L_{pem}(C)$ represents a third loss (i.e., a potential energy loss), $\gamma$ and b represent parameters with adjustable values, $\gamma > 0$, and $b < r_0$, K represents the number of classes, where $K > 2$, dis(,) represents a distance operator by which a Euclidean distance of an operation object within brackets is determined, and $c_i$ and $c_j$ represent the center of an $i^{th}$ class and the center of a $j^{th}$ class.

In some embodiments, the data classification model may also be trained with the first training rule, the second training rule, and the third training rule using the back propagation algorithm. Specifically, the data classification model may be trained using a weighted sum of the first loss function, the second loss function, and the third loss function.

Due to the use of the third training rule, it is equivalent to aggregating the features of representative data (i.e., cluster centers) of each class with the features of real data, so that the cluster centers are more uniform and noise interference is reduced. By starting training from any random sample data, a data classification model without over-fitting noise can be quickly obtained.

In some embodiments, the first loss function may include a first parameter set associated with the probabilities, the second loss function may include a second parameter set associated with the relevances, and the third loss function may include a third parameter set associated with the distances.

In some embodiments, the goal of training the data classification model may include minimizing a weighted sum of the following: the first loss function, the second loss function, and the third loss function.

Since the first loss function may include the first parameter set associated with the probabilities, the second loss function may include the second parameter set associated with the relevances, and the third loss function may include the third parameter set associated with the distances, a value of at least one parameter in the first parameter set, the second parameter set, and/or the third parameter set may be adjusted to minimize the weighted sum. For example, one or more of the parameters, such as v, u, $\gamma$, b and $\epsilon$, may be adjusted to achieve a training goal.

In some embodiments, at least one parameter in the first parameter set may be adjusted such that the probabilities of correctly classifying the sample data are increased to minimize the weighted sum. At least one parameter in the second parameter set may also be adjusted such that the relevances between the sample data and corresponding correct classes are enhanced to minimize the weighted sum. At least one parameter in the third parameter set may also be adjusted such that the distances between the central sample data and the adjacent central sample data are shorter to minimize the weighted sum. The training goal may be achieved using the above three modes simultaneously, or using one or two of them.

Figure 3A:
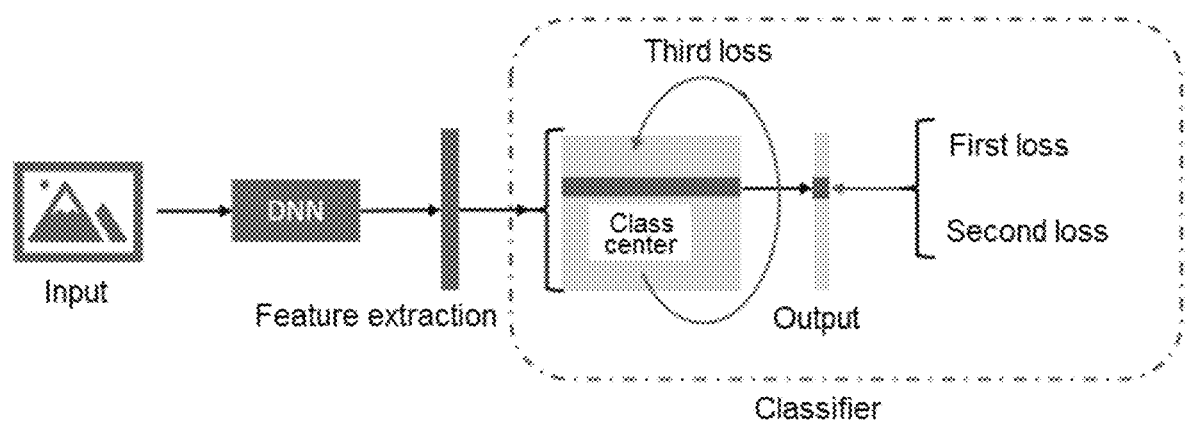
FIG. 3A illustrates a schematic block diagram of a training frame according to some embodiments of the present disclosure.

FIG. 3A illustrates a schematic block diagram of a training frame according to some embodiments of the present disclosure.

As shown in the figure, when sample data 102 is input into a value data processing model (DNN for example), features are first extracted. The DNN is then trained using method 200. In a classifier of the DNN, a prediction class for sample data 102 is output and weights of nodes in the DNN are adjusted with the first training rule and the second training rule using the back propagation algorithm to meet the training goal. The third loss function acts as a loop constraint to further enhance the robustness of the data classification model to noise.

Figure 3B:
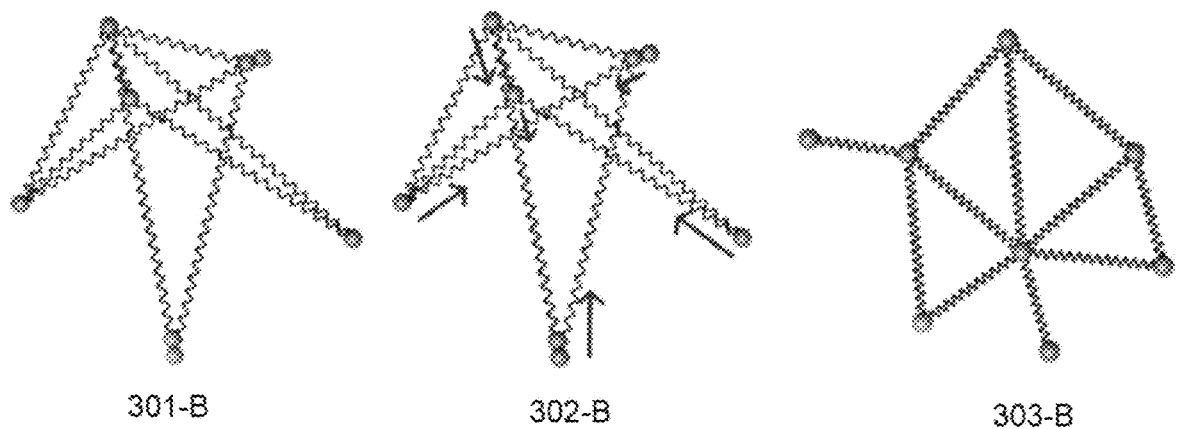
FIG. 3B illustrates a schematic diagram of a training effect according to some embodiments of the present disclosure.

FIG. 3B illustrates a schematic diagram of a training effect according to some embodiments of the present disclosure.

As shown in the figure, at 301-B, when training begins, the centers of various classes are not uniform enough, and therefore the corresponding features are not sufficient. The centers of the various classes move in directions that are uniform with respect to each other at the beginning of training, i.e., at 302-B. And a relatively uniform distribution is achieved at 303-B, i.e., at the end of training. In this way, the accuracy of the data classification model is improved, and interference with noise can be eliminated to some extent.

Figure 4:
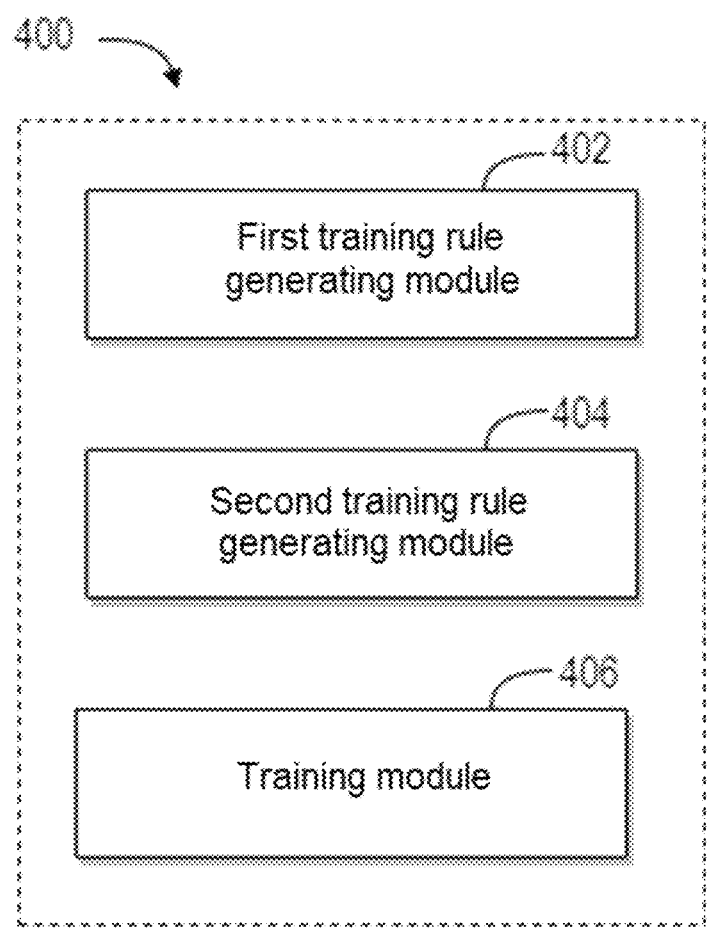
FIG. 4 illustrates a block diagram of an apparatus for training a data classification model according to some embodiments of the present disclosure.

FIG. 4 illustrates a block diagram of an apparatus for training a data classification model according to some embodiments of the present disclosure.

Apparatus 400 includes first training rule generating module 402, configured to generate a first training rule based on probabilities of classifying a plurality of sample data into corresponding classes by a data classification model.

Apparatus 400 also includes second training rule generating module 404, configured to generate a second training rule based on relevances of the plurality of sample data to the corresponding classes.

Apparatus 400 also includes training module 406, configured to train the data classification model using the first training rule and the second training rule.

In some embodiments, apparatus 400 may also include a third training rule generating module, configured to cluster the plurality of sample data to determine corresponding central sample data located at each cluster center among the plurality of sample data, and generate a third training rule based on corresponding distances between the central sample data and adjacent central sample data. Training module 406 may also be configured to train the data classification model using the first training rule, the second training rule, and the third training rule.

In some embodiments, the first training rule, the second training rule, and the third training rule may include corresponding first, second, and third loss functions.

In some embodiments, the training module may also be configured to: determine the goal of training the data classification model as minimizing a weighted sum of the following: the first loss function, the second loss function, and the third loss function.

In some embodiments, the first loss function may include a first parameter set associated with the probabilities, the second loss function may include a second parameter set associated with the relevances, and the third loss function may include a third parameter set associated with the distances.

In a certain embodiment, the training module may also be configured to adjust a value of at least one parameter in the first parameter set, the second parameter set, and/or the third parameter set such that the weighted sum is minimized.

In some embodiments, the training module may also be configured to minimize the weighted sum in the following manner: adjusting at least one parameter in the first parameter set such that the probabilities of correctly classifying the sample data are increased, adjusting at least one parameter in the second parameter set such that the relevances between the sample data and corresponding correct classes are enhanced, and/or adjusting at least one parameter in the third parameter set such that the distances between the central sample data and the adjacent central sample data are shorter.

It will be appreciated that the data classification model trained by apparatus 400 described above not only solves the problem of improving the accuracy of data classification, but also reduces the sensitivity of the data classification model to noise, thereby improving the anti-noise capacity of the data classification model and further improving the accuracy of data classification. Therefore, apparatus 400 may also provide at least one of method 200 and other advantages described above.

Figure 5:
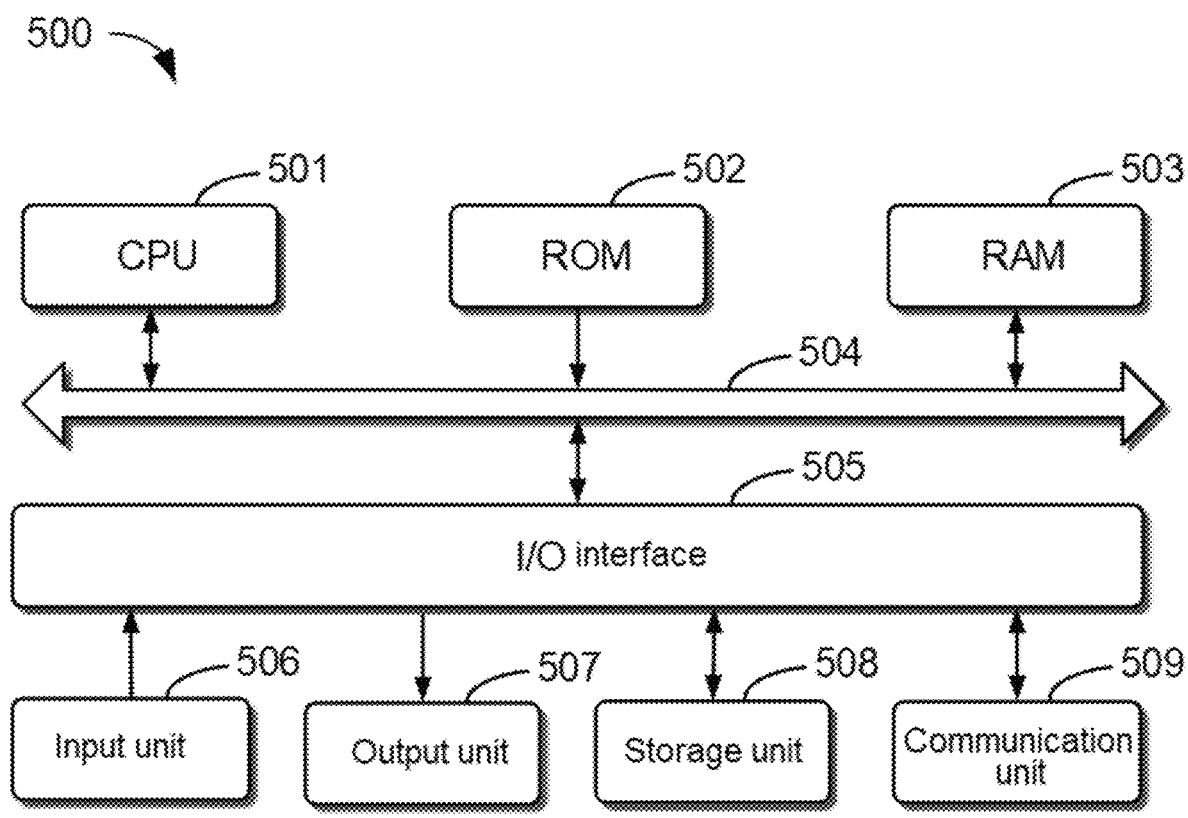
FIG. 5 illustrates a schematic block diagram of an example device that may be configured to implement some embodiments of the present disclosure.

FIG. 5 shows a schematic block diagram of device 500 that may be configured to implement embodiments of the present disclosure. Device 500 may be an electronic device described in embodiments of the present disclosure. As shown in FIG. 5, device 500 includes central processing unit (CPU) 501 which may perform various appropriate actions and processing according to computer program instructions stored in read-only memory (ROM) 502 or computer program instructions loaded from storage unit 508 to random access memory (RAM) 503. Various programs and data required for the operation of device 500 may also be stored in RAM 503. CPU 501, ROM 502, and RAM 503 are connected to each other through bus 504. Input/output (I/O) interface 505 is also connected to bus 504. Although not shown in FIG. 5, device 500 may also include a coprocessor.

A plurality of components in device 500 are connected to I/O interface 505, including: input unit 506, such as a keyboard and a mouse; output unit 507, such as various types of displays and speakers; storage unit 508, such as a magnetic disk and an optical disc; and communication unit 509, such as a network card, a modem, and a wireless communication transceiver. Communication unit 509 allows device 500 to exchange information/data with other devices via a computer network, such as the Internet, and/or various telecommunication networks.

The various methods or processes described above may be performed by CPU 501. For example, in some embodiments, the method may be implemented as a computer software program that is tangibly included in a machine-readable medium, such as storage unit 508. In some embodiments, part of or all the computer program may be loaded and/or installed to device 500 via ROM 502 and/or communication unit 509. When the computer program is loaded into RAM 503 and executed by CPU 501, one or more steps or actions of the methods or processes described above may be executed.

In some embodiments, the methods and processes described above may be implemented as a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for performing the operations of the present disclosure may be assembly instructions, instruction set architecture (ISA) instructions, machine instructions, machine-related instructions, microcode, firmware instructions, status setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the devices, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two consecutive blocks may in fact be executed substantially concurrently, and sometimes they may also be executed in the reverse order, depending on the functions involved. It should be further noted that each block in the block diagrams and/or flow charts as well as a combination of blocks in the block diagrams and/or flow charts may be implemented by using a special hardware-based system that executes specified functions or actions, or implemented using a combination of special hardware and computer instructions.

Various embodiments of the present disclosure have been described above. The foregoing description is illustrative rather than exhaustive, and is not limited to the disclosed various embodiments. Numerous modifications and alterations will be apparent to those of ordinary skill in the art without departing from the scope and spirit of the illustrated embodiments. The selection of terms as used herein is intended to best explain the principles and practical applications of the various embodiments or the technical improvements to technologies on the market, so as to enable persons of ordinary skill in the art to understand the embodiments disclosed here.

Some example implementations of the present disclosure are listed below.

In a first aspect of the present disclosure, a method for training a data classification model is provided. The method includes generating a first training rule based on probabilities of classifying a plurality of sample data into corresponding classes by a data classification model. The method also includes generating a second training rule based on relevances of the plurality of sample data to the corresponding classes. The method also includes training the data classification model using the first training rule and the second training rule.

In some embodiments, the method also includes: clustering the plurality of sample data to determine corresponding central sample data located at each cluster center among the plurality of sample data. The method may also include generating a third training rule based on corresponding distances between the central sample data and adjacent central sample data. In addition, the method also includes training the data classification model using the first training rule, the second training rule, and the third training rule.

In some embodiments, the first training rule, the second training rule, and the third training rule include corresponding first, second, and third loss functions.

In some embodiments, the goal of training the data classification model includes minimizing a weighted sum of the following: the first loss function, the second loss function, and the third loss function.

In some embodiments, the first loss function includes a first parameter set associated with the probabilities, the second loss function includes a second parameter set associated with the relevances, and the third loss function includes a third parameter set associated with the distances.

In some embodiments, the method also includes adjusting a value of at least one parameter in the first parameter set, the second parameter set, and/or the third parameter set such that the weighted sum is minimized.

In some embodiments, the method also includes minimizing the weighted sum in the following manner: adjusting at least one parameter in the first parameter set such that the probabilities of correctly classifying the sample data are increased, adjusting at least one parameter in the second parameter set such that the relevances between the sample data and corresponding correct classes are enhanced, and/or adjusting at least one parameter in the third parameter set such that the distances between the central sample data and the adjacent central sample data are shorter.

In a second aspect of the present disclosure, an electronic device is provided. The electronic device includes a processor and a memory coupled to the processor, and the memory has instructions stored therein which, when executed by the processor, cause the device to perform actions. The actions include generating a first training rule based on probabilities of classifying a plurality of sample data into corresponding classes by a data classification model. The actions also include generating a second training rule based on relevances of the plurality of sample data to the corresponding classes. In addition, the actions also include training the data classification model using the first training rule and the second training rule.

In some embodiments, the actions also include: clustering the plurality of sample data to determine corresponding central sample data located at each cluster center among the plurality of sample data. The actions also include generating a third training rule based on corresponding distances between the central sample data and adjacent central sample data. In addition, the actions also include training the data classification model using the first training rule, the second training rule, and the third training rule.

In some embodiments, the first training rule, the second training rule, and the third training rule include corresponding first, second, and third loss functions.

In some embodiments, the goal of training the data classification model includes minimizing a weighted sum of the following: the first loss function, the second loss function, and the third loss function.

In some embodiments, the first loss function includes a first parameter set associated with the probabilities, the second loss function includes a second parameter set associated with the relevances, and the third loss function includes a third parameter set associated with the distances.

In some embodiments, the actions also include adjusting a value of at least one parameter in the first parameter set, the second parameter set, and/or the third parameter set such that the weighted sum is minimized.

In some embodiments, the actions also include minimizing the weighted sum in the following manner: adjusting at least one parameter in the first parameter set such that the probabilities of correctly classifying the sample data are increased, adjusting at least one parameter in the second parameter set such that the relevances between the sample data and corresponding correct classes are enhanced, and/or adjusting at least one parameter in the third parameter set such that the distances between the central sample data and the adjacent central sample data are shorter.

In embodiments of a third aspect, an apparatus for training a model is provided. The apparatus includes a first training rule generating module, configured to generate a first training rule based on probabilities of classifying a plurality of sample data into corresponding classes by a data classification model. The apparatus also includes a second training rule generating module, configured to generate a second training rule based on relevances of the plurality of sample data to the corresponding classes. In addition, the apparatus also includes a training module, configured to train the data classification model using the first training rule and the second training rule.

In embodiments of a fourth aspect, a computer-readable storage medium is provided. The computer-readable storage medium has one or more computer instructions stored thereon, which are executed by a processor to implement the method according to the first aspect.

In embodiments of a fifth aspect, a computer program product is provided. The computer program product includes one or more computer instructions which are executed by a processor to implement the method according to the first aspect.

Although the present disclosure has been described in language specific to structural features and/or methodological and logical acts, it will be appreciated that the subject matter defined in the appended claims is not necessarily limited to the specific features or acts described above. Rather, the specific features and acts described above are merely example forms of implementing the claims.

What is claimed is:

1. A method for training a data classification model, comprising:
   generating a first training rule based on probabilities of classifying a plurality of sample data into corresponding classes by a data classification model;
   generating a second training rule based on relevances of the plurality of sample data to the corresponding classes; and training the data classification model using the first training rule, the second training rule and at least one additional training rule comprising a distance-based training rule;
wherein one or more of the first training rule, the second training rule and the at least one additional training rule comprise respective loss functions.

2. The method according to claim 1, further comprising:
clustering the plurality of sample data to determine corresponding central sample data located at each cluster center among the plurality of sample data;
generating a third training rule based on corresponding distances between the central sample data and adjacent central sample data; and
training the data classification model using the first training rule, the second training rule, and the third training rule.

3. The method according to claim 2, wherein
the first training rule, the second training rule, and the third training rule comprise corresponding first, second, and third loss functions.

4. The method according to claim 3, wherein
the goal of training the data classification model comprises minimizing a weighted sum of the following: the first loss function, the second loss function, and the third loss function.

5. The method according to claim 4, wherein
the first loss function comprises a first parameter set associated with the probabilities;
the second loss function comprises a second parameter set associated with the relevances; and
the third loss function comprises a third parameter set associated with the distances.

6. The method according to claim 5, further comprising:
adjusting a value of at least one parameter in at least one of the first parameter set, the second parameter set, and the third parameter set such that the weighted sum is minimized.

7. The method according to claim 6, further comprising: minimizing the weighted sum in accordance with at least one of the following:
adjusting at least one parameter in the first parameter set such that the probabilities of correctly classifying the sample data are increased;
adjusting at least one parameter in the second parameter set such that the relevances between the sample data and corresponding correct classes are enhanced; and
adjusting at least one parameter in the third parameter set such that the distances between the central sample data and the adjacent central sample data are shorter.

8. The method according to claim 1, wherein the distance-based training rule comprises a potential energy loss determined utilizing a potential energy model.

9. An electronic device, comprising:
a processor; and
a memory coupled to the processor, wherein the memory has instructions stored therein, and the instructions, when executed by the processor, cause the device to execute actions comprising:
generating a first training rule based on probabilities of classifying a plurality of sample data into corresponding classes by a data classification model;
generating a second training rule based on relevances of the plurality of sample data to the corresponding classes; and training the data classification model using the first training rule, the second training rule and at least one additional training rule comprising a distance-based training rule;
wherein one or more of the first training rule, the second training rule and the at least one additional training rule comprise respective loss functions.

10. The electronic device according to claim 9, wherein the actions further comprise:
clustering the plurality of sample data to determine corresponding central sample data located at each cluster center among the plurality of sample data;
generating a third training rule based on corresponding distances between the central sample data and adjacent central sample data; and
training the data classification model using the first training rule, the second training rule, and the third training rule.

11. The electronic device according to claim 10, wherein
the first training rule, the second training rule, and the third training rule comprise corresponding first, second, and third loss functions.

12. The electronic device according to claim 11, wherein
the goal of training the data classification model comprises minimizing a weighted sum of the following: the first loss function, the second loss function, and the third loss function.

13. The electronic device according to claim 12, wherein
the first loss function comprises a first parameter set associated with the probabilities;
the second loss function comprises a second parameter set associated with the relevances; and
the third loss function comprises a third parameter set associated with the distances.

14. The electronic device according to claim 13, wherein the actions further comprise:
adjusting a value of at least one parameter in at least one of the first parameter set, the second parameter set, and the third parameter set such that the weighted sum is minimized.

15. The electronic device according to claim 14, further comprising: minimizing the weighted sum through at least one of the following actions:
adjusting at least one parameter in the first parameter set such that the probabilities of correctly classifying the sample data are increased;
adjusting at least one parameter in the second parameter set such that the relevances between the sample data and corresponding correct classes are enhanced; and
adjusting at least one parameter in the third parameter set such that the distances between the central sample data and the adjacent central sample data are shorter.

16. The electronic device according to claim 9, comprising:
a first training rule generating module, configured to generate the first training rule based on probabilities of classifying a plurality of sample data into corresponding classes by a data classification model;
a second training rule generating module, configured to generate the second training rule based on relevances of the plurality of sample data to the corresponding classes; and
a training module, configured to train the data classification model using the first training rule and the second training rule.

17. A computer program product comprising a non-transitory computer-readable storage medium having computer instructions stored thereon, wherein the instructions when executed by a machine cause the machine to implement a method for training a data classification model, the method comprising:

generating a first training rule based on probabilities of classifying a plurality of sample data into corresponding classes by a data classification model;

generating a second training rule based on relevances of the plurality of sample data to the corresponding classes; and training the data classification model using the first training rule, the second training rule and at least one additional training rule comprising a distance-based training rule;

wherein one or more of the first training rule, the second training rule and the at least one additional training rule comprise respective loss functions.

18. The computer program product according to claim 17, further comprising:

clustering the plurality of sample data to determine corresponding central sample data located at each cluster center among the plurality of sample data;

generating a third training rule based on corresponding distances between the central sample data and adjacent central sample data; and training the data classification model using the first training rule, the second training rule, and the third training rule.

19. The computer program product according to claim 18, wherein the first training rule, the second training rule, and the third training rule comprise corresponding first, second, and third loss functions.

20. The computer program product according to claim 19, wherein the goal of training the data classification model comprises minimizing a weighted sum of the following: the first loss function, the second loss function, and the third loss function.

21. The computer program product according to claim 20, wherein the first loss function comprises a first parameter set associated with the probabilities;

the second loss function comprises a second parameter set associated with the relevances; and the third loss function comprises a third parameter set associated with the distances.

* * * * *